(12) United States Patent
Li

(10) Patent No.: US 6,711,172 B1
(45) Date of Patent: Mar. 23, 2004

(54) NETWORK PACKET ROUTING

(75) Inventor: Yunzhou Li, Lowell, MA (US)

(73) Assignee: Nortel Networks Corp. (CA)

( * ) Notice: Subject to any disclaimer, the term of this patent is extended or adjusted under 35 U.S.C. 154(b) by 0 days.

(21) Appl. No.: 09/366,136

(22) Filed: Aug. 2, 1999

(51) Int. Cl.[7] .......................... H04L 12/28; H04L 12/56
(52) U.S. Cl. ........................................ 370/401; 370/432
(58) Field of Search ................................ 370/389, 400, 370/401, 351, 432, 475, 390, 230, 237; 709/230, 238, 241

(56) References Cited

U.S. PATENT DOCUMENTS

| | | | | |
|---|---|---|---|---|
| 5,241,682 A | * | 8/1993 | Bryant ........................ | 395/800 |
| 5,430,727 A | * | 7/1995 | Callon ...................... | 370/85.13 |
| 5,917,820 A | * | 6/1999 | Rekhter ...................... | 370/392 |
| 6,078,590 A | * | 6/2000 | Farinacci .................... | 370/432 |
| 6,130,890 A | * | 10/2000 | Leinwand ................... | 370/400 |
| 6,272,139 B1 | * | 8/2001 | Soncodi ...................... | 370/395 |
| 6,275,492 B1 | * | 8/2001 | Zhang ........................ | 370/392 |
| 6,331,983 B1 | * | 12/2001 | Haggerty .................... | 370/400 |
| 6,473,421 B1 | * | 10/2002 | Tappan ........................ | 370/351 |

OTHER PUBLICATIONS

D. Estrin, D. Farinacci, A. Helmy, D. Thaler, S. Deering. M. Handley, V. Jacobson, C. Liu, P. Sharma and L. Wei, Protocol Independent Multicast–Sparse Mode (PIM–SM): Protocol Specification, Jun. 1998.

* cited by examiner

*Primary Examiner*—Ajit Patel
*Assistant Examiner*—Chirag Shah
(74) *Attorney, Agent, or Firm*—Steubing McGuinness & Manaras LLP

(57) ABSTRACT

A method of routing network packets to a border router joining different network domains includes defining a range of addresses for the border router in a router forwarding table, receiving a network packet, determining addresses included in the network packet, performing a search on the router forwarding table using the determined addresses, and transmitting the packet to the border router if the defined range of addresses matches for the determined addresses.

19 Claims, 12 Drawing Sheets

NETWORK PACKET ROUTING

BACKGROUND OF THE INVENTION

This invention relates to network packet routing.

Computer networks enable computers on opposite sides of the world to exchange e-mail, internet web-pages, chat messages, and other electronic information. Typically, programs divide electronic information into packets for transmission over a network. A packet is like an envelope with a return address (the packet source) and a mailing address (the packet destination). Instead of streets and zip codes, however, packets use IP (Internet Protocol) addresses to identify source and destination computers. An IP address can be 32-bits long. Instead of writing out all 32 1s or 0s or an equivalent decimal number, IP addresses are commonly written as a set of four digits ranging from 1 to 255 (e.g., 128.233.45.100).

Much as an envelope reaches its mailing address via a series of post offices, a network packet reaches a destination address by winding its way through network computers known as routers. Each router examines a packet's destination address and tries to determine how to advance the packet to another router to reach its ultimate destination.

A sender can send a packet using unicasting or multicasting techniques. Unicasting delivers a message from a single source to single destination. To send a packet using unicasting, a sender sets a packet's destination address to a particular network computer's IP address.

Multicasting delivers a message from a single source to multiple destinations. To send a packet using multicasting, a sender sets a packet's destination address to an IP group address. A router receiving a packet having a group address can forward the message to individual members of the group.

SUMMARY OF THE INVENTION

In general, in one aspect, a method of routing network packets to a border router joining different network domains includes defining a range of addresses for the border router in a router forwarding table, receiving a network packet, determining addresses included in the network packet, performing a search on the router forwarding table using the determined addresses, and transmitting the packet to the border router if the defined range of addresses matches for the determined addresses.

Embodiments may include one or more of the following features. The search may be a longest match search. The network domain may comprise a Protocol Independent Multicasting (PIM) sparse-mode domain. Defining a range of addresses may include determining group addresses serviced by a rendezvous point, for example, by looking up the group addresses in an RP-set that describes group addresses serviced by rendezvous points.

Defining a range of addresses may be done by adding an (*,G/prefix) state to the router forwarding table for the range of addresses. Determining addresses may include determining the source and or group destination address of the network packet. The addresses may be Internet Protocol (IP) address. Performing the search may include determining whether the match is an (S,G) state, an (*,G) state, and/or an (*,G/prefix) state.

The router forwarding table may include group and source address pairs and corresponding states. The corresponding states may include input and output interfaces. Transmitting the packet to the border router may include transmitting the packet via an output interface corresponding to the state determined by the longest match search.

In general, in another aspect, the invention features a method of routing network packets to a Protocol Independent Multicasting (PIM) border router that joins a PIM sparse-mode domain with a different network domain. The method includes receiving a PIM (*,*,RP) state transmitted by the PIM border router to a rendezvous point RP, determining group addresses handled by the rendezvous point and defining a (*,G/prefix) state in a router forwarding table based on the determined group addresses of the PIM rendezvous point RP.

In general, in another aspect, a computer program, disposed on a computer readable medium, includes instructions for causing a router to route network packets to a border router joining different network domains. The program includes instructions that define a range of addresses for the border router in a router forwarding table, receive a network packet, determine addresses included in the network packet, perform a search on the router forwarding table using the determined addresses, and transmit the packet to the border router if the defined range of addresses matches for the determined addresses.

Advantages of the invention will become apparent in view of the following description, including the figures, and the claims.

DESCRIPTION OF THE PREFERRED EMBODIMENTS

Introduction

Multicasting enables a source to transmit the same message to different members in a group. All groups, however, are not the same. Some groups may include a large number of members served by neighboring routers. Other groups may have a handful of members strewn across the network. These differences in group composition complicates multicasting. Some multicasting techniques that are efficient for large groups waste network resources when used for smaller groups.

A multicasting protocol known as Protocol Independent Multicasting (PIM) offers different multicasting modes suitable for different kinds of groups. PIM dense-mode can efficiently multicast data to a large number of group members. PIM sparse-mode can efficiently multicast data when a group has only a few members. PIM sparse mode is explained in detail in Network Working Group, RFC 2362, "Protocol Independent Multicasting—Sparse Mode: Protocol Specification", L. Wei et al., Jun. 1998.

Figure 1:
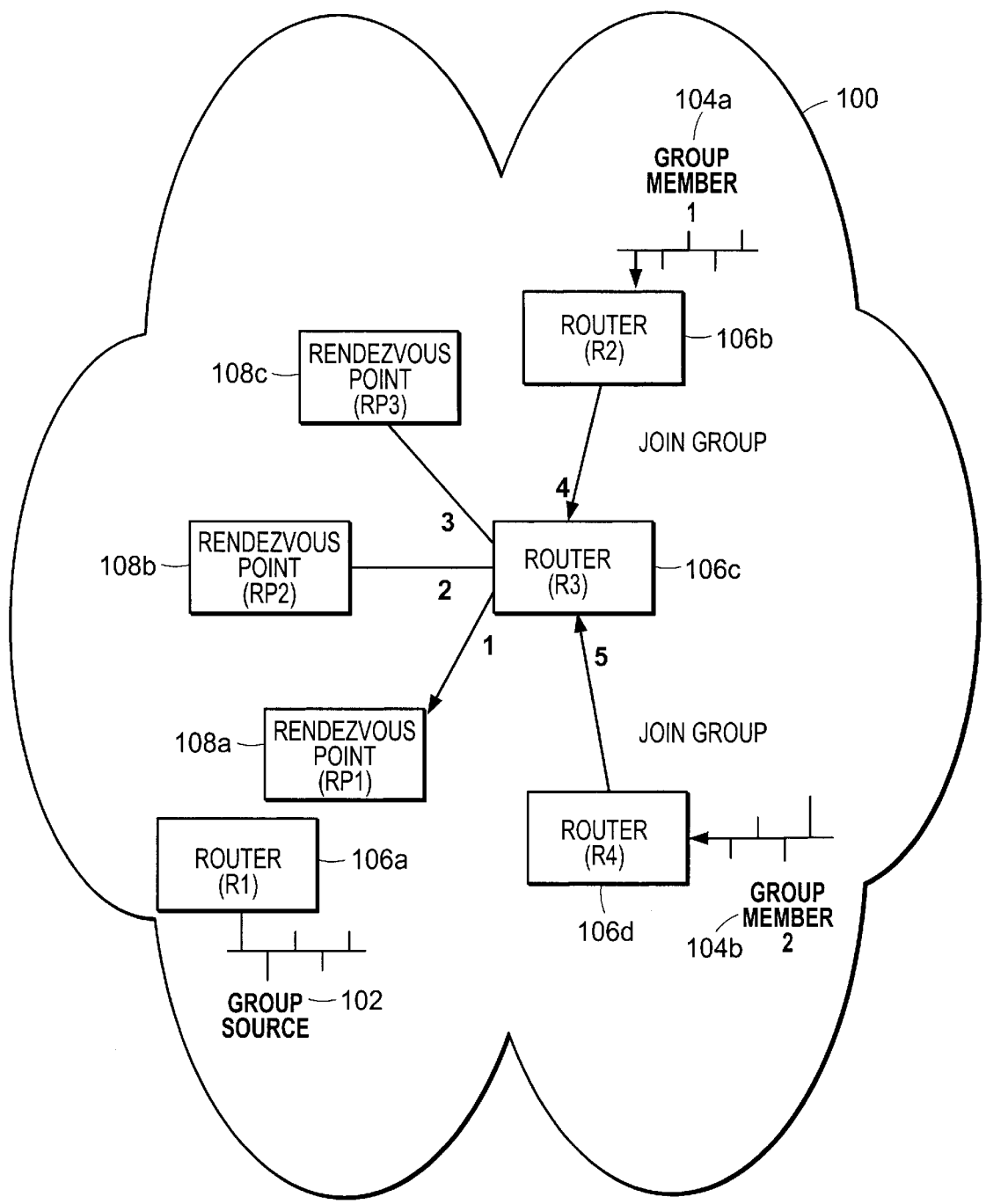
FIG. 1 is a diagram showing members joining a multicast group at a rendezvous point.

FIG. 1 shows a PIM network domain 100 operating in sparse-mode. The network 100 includes rendezvous points 108a–108c (RPs) that match multicast sources 102 with multicast group members 104a, 104b.

To join a multicast group, a computer sends a request for group membership (e.g., an IGMP (Internet Group Management Protocol) message) to a local router. The local router, in turn, triggers transmission of a JOIN message to a rendezvous point. Thereafter, the group member receives copies of multicast data sent to the rendezvous point for distribution to the group. For example, as shown, computer 104a can join a group by sending an IGMP message to local router 106b. Router 106d, in turn, transmits a JOIN message to rendezvous point 108a via network router 106c.

Figure 2:
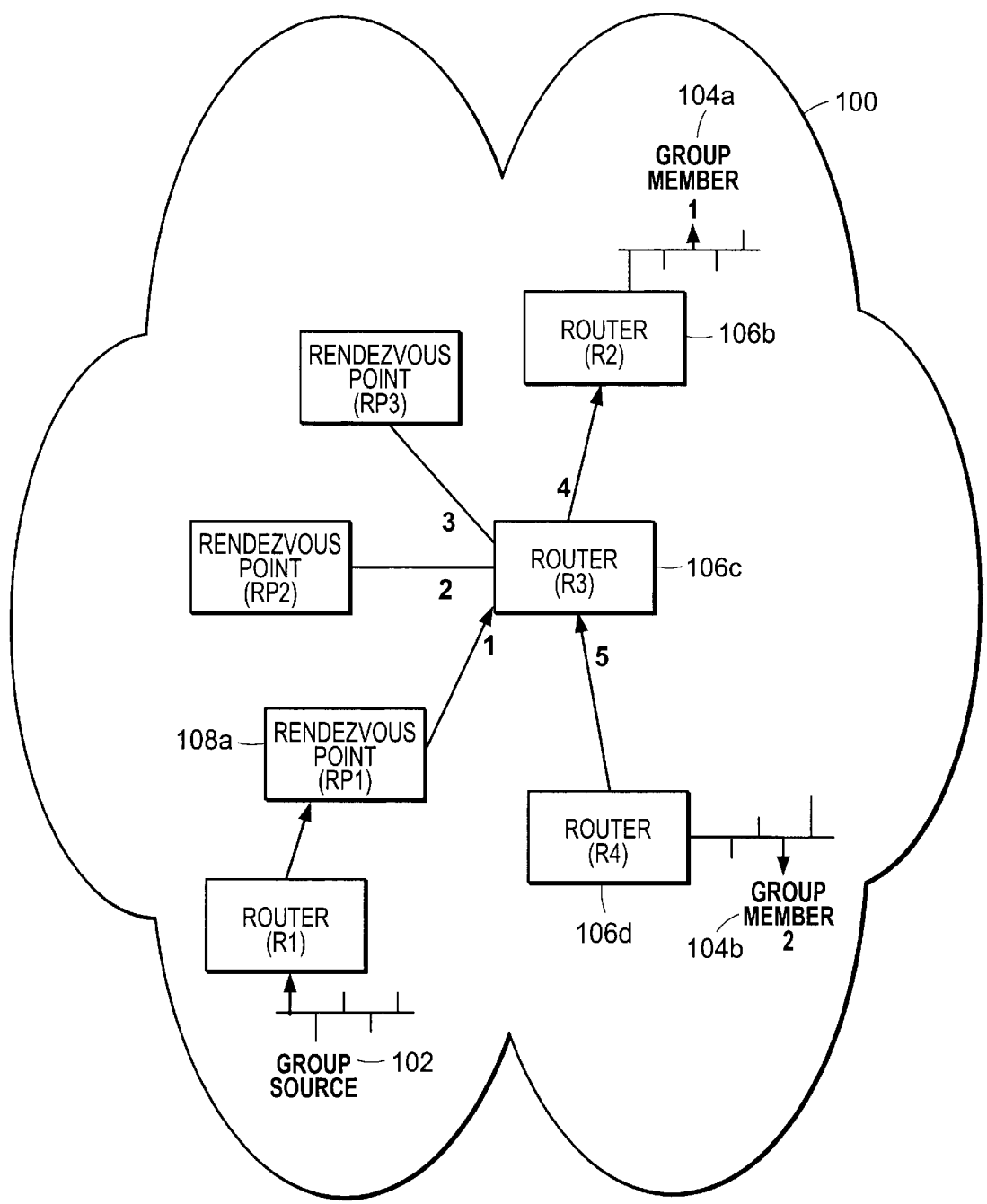
FIG. 2 is a diagram showing members receiving multicast messages via the rendezvous point.

FIG. 2 shows a source 102 multicasting messages to group members 104a, 104b. The source 102 sends multicast data to the rendezvous point 104a for forwarding to group members 104a, 104b.

Transmitting the messages via the rendezvous point 108a may not be the most efficient transmission path to the group members 104a, 104b. However, discovering a more efficient path can consume significant resources. Nevertheless, during periods of high network traffic, the extra cost of finding an alternate path may be worthwhile.

Figure 3:
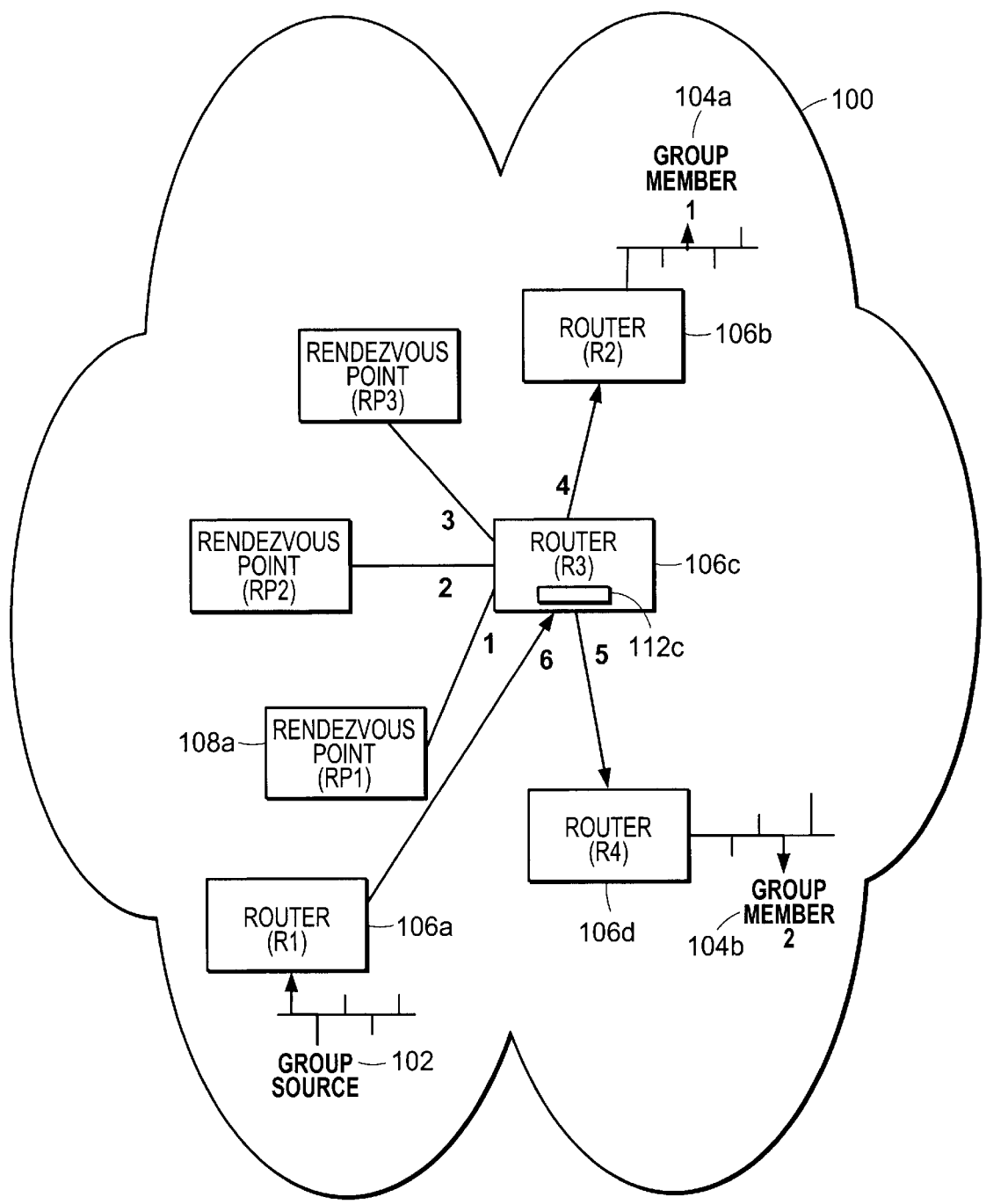
FIG. 3 is a diagram showing members receiving multicast messages via a shortest path tree.

As shown in FIG. 3, after establishing a multicasting session at a rendezvous point, PIM enables construction of a more efficient path from a source to group members. This is known as switching to a "shortest path tree." For example, as shown, router 106c receives multicast messages directly from router 106a, bypassing rendezvous point 108a. After finding the shortest path tree, group members 104a, 104b can send messages to halt transmission of packets from the rendezvous point 108a.

In FIGS. 1–3, router 106c sends and receives packets to and from network routers over interfaces (labeled "1" through "6"). For example, in FIG. 1, router 106c receives a JOIN message on interface "4" and forwards the message to rendezvous point 108a via interface "1". To determine where to route a packet, router 106c uses a router forwarding table 112c that correlates incoming packet addresses with outgoing interfaces.

Figure 4:
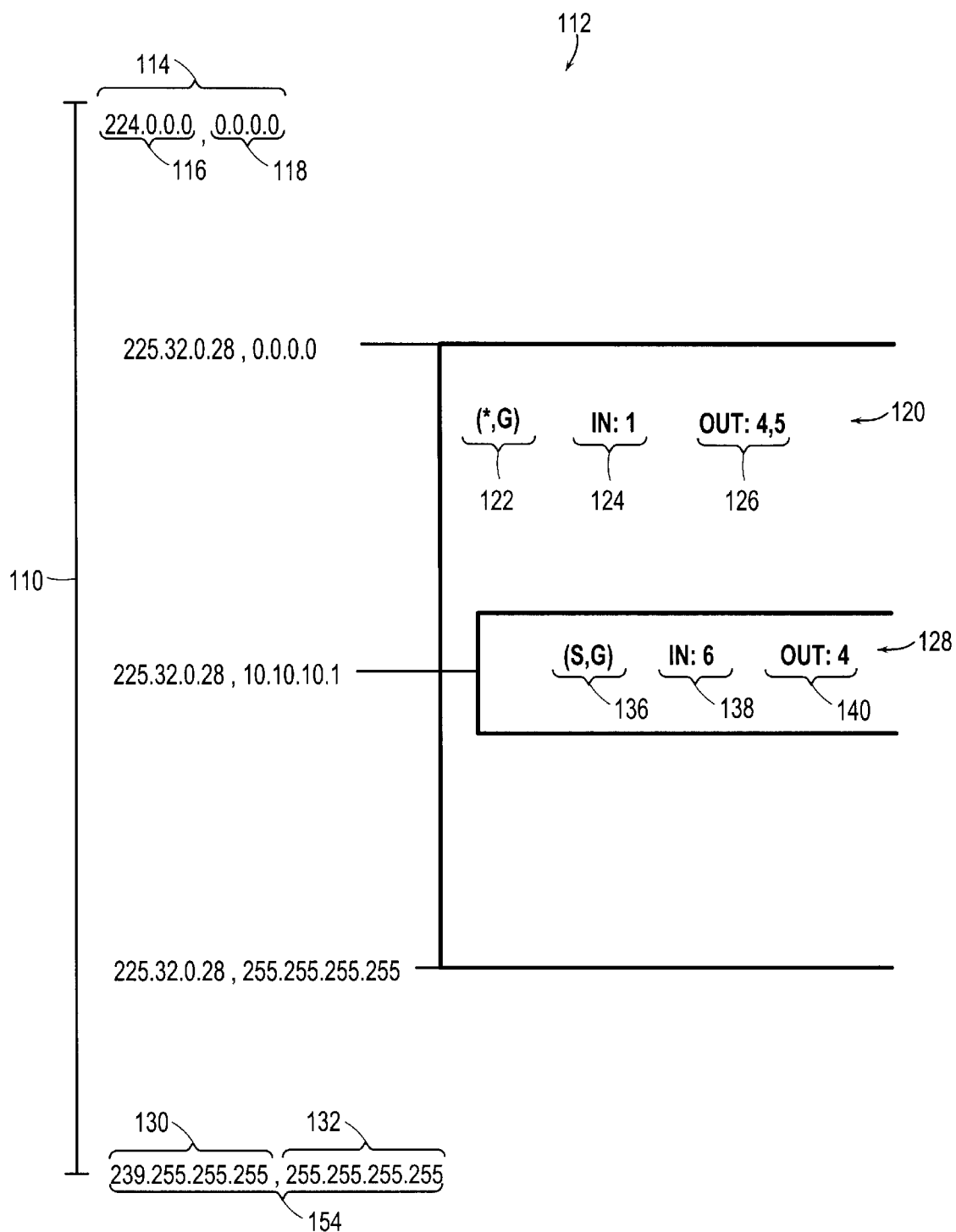
FIG. 4 is a diagram of a router forwarding table.

FIG. 4 shows a router forwarding table 112 that correlates IP source and destination addresses 110 with different "state entries" 120, 128. The state entries 120, 128 instruct the router where to forward the received packet. Thus, by determining the IP source and group destination addresses of a received packet, a router can use the forwarding table 112 to determine a state entry 120, 128 corresponding to the addresses and can forward the packet accordingly.

As shown, the forwarding table 112 can organize entries by increasing group addresses 110. The Internet Protocol address scheme reserves addresses 224.0.0.0 116 through 239.255.255.255 130 for group addresses. Thus, the list of addresses 110 can range from the lowest possible group address 116 to the highest 130. Each group address can be combined with a source address 118, 132 to produce a group/source address pair. The different pairs can be used as access keys to the router forwarding table.

State entries 120, 128 correspond to different address ranges or individual addresses. PIM defines different types of states including an (S,G) state and an (*,G) state.

An (S,G) state 128 can be used to handle packets having a particular source address, S, and a particular group address, G. A router commonly defines an (S,G) state during "shortest path tree" routing (shown in FIG. 3).

As shown in FIG. 4, a sample (S,G) state 128 handles packets having an IP group address of 225.32.0.28 and an IP source address of 10.10.10.1. When a router receives a packet having this group/source address pair, a router can consult the state entry's interface information 138, 140 to determine how to route the packet. The interface information includes a description of input 138 and output 140 interfaces. When a packet arrives over an incoming interface 138, the router can send the packet out via the outgoing interfaces 140. Thus, if a packet having a group address of 225.32.0.28 and a source address of 10.10.10.1 arrives over interface "6", the router can transmit the packet via interface "4".

The (*,G) state can correspond to a range of group/source address pairs. The (*,G) is usually produced by JOIN messages received by a router on its way to a rendezvous point. Essentially, the * in the (*,G) state is a wildcard and enables a (*,G) state to match any packet having the group address G regardless of the packet's source address. As shown, the (*,G) state entry 120 covers all group/source address pairs having a group address of 225.32.0.28. When the router receives a packet having a group address of 225.32.0.28, the router can transmit the packet in accordance with the (*,G) entry 120 interface 124, 126 information. That is, if the packet arrived on interface "1", the router will transmit the packet over interfaces "4" and "5". This corresponds to the multicasting of router 106c in FIG. 2.

As shown, state entries in the forwarding table 112 can overlap or nest. For example, the range of addresses covered by the (*,G) 120 state includes the (S,G) 128 state entry. When a router receives a packet, the router uses the narrowest entry covering the packet's group/source address pair. This is known as a longest match search. For example, if an incoming packet has a Group address of 225.32.0.28 and a source address of 10.10.10.1, a longest match search will result in use of the (S,G) state 128 instead of the (*,G) state 120 because the (S,G) state 128 covers a single group/source address pair while the (*,G) state 120 covers a range of group/source address pairs. In other words, the (S,G) state 128 covers a narrower set of group/source pairs than the (*,G) state 120. However, if an incoming packet has a group address of 225.32.0.28 and a source address of 10.20.20.8, the longest match search will result in use of the (*,G) state 120 since the (S,G) state does not cover the source/group address pair.

Routing Between Network Domains

Figure 5:
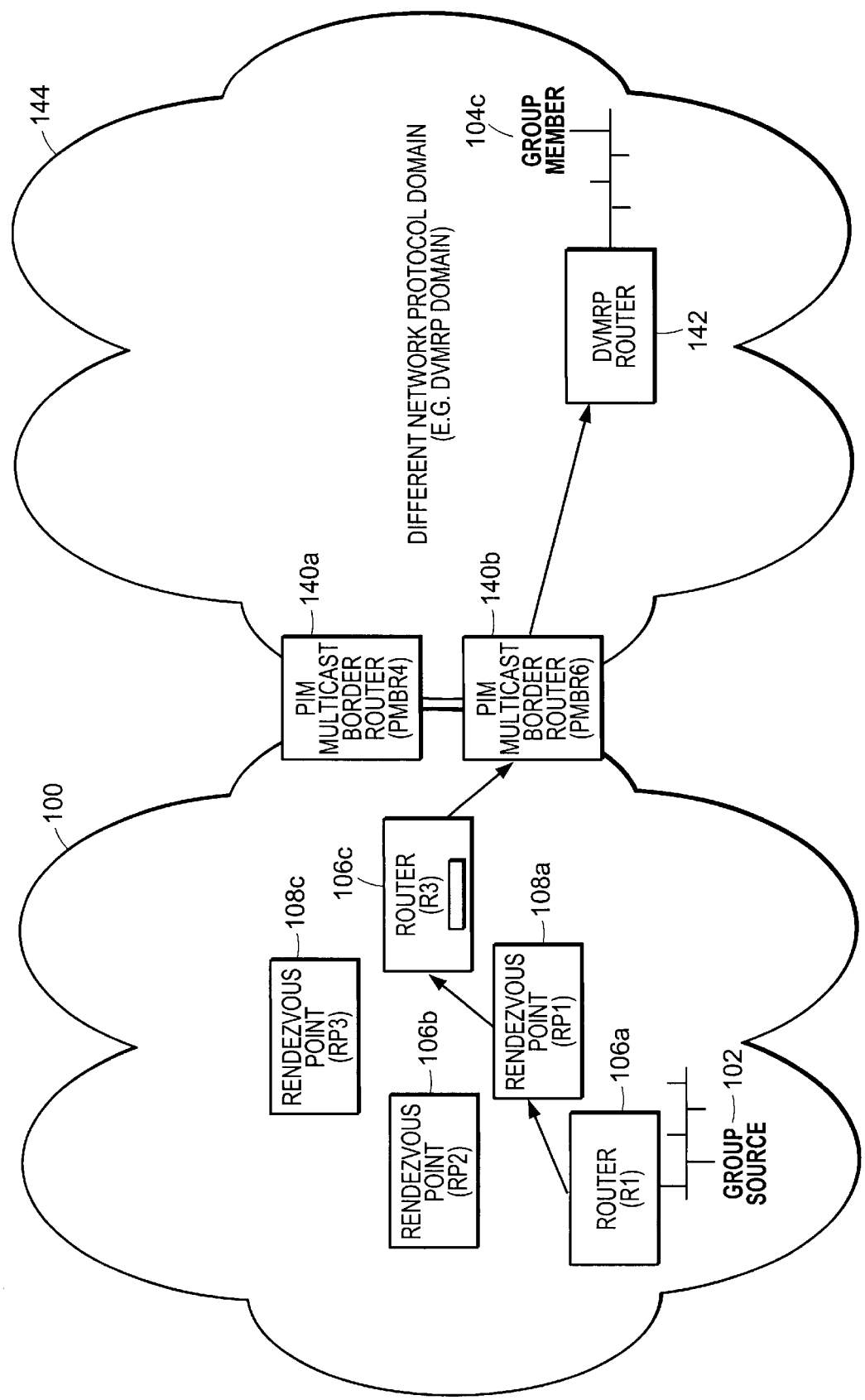
FIG. 5 is a diagram of networks joined by border routers.

FIG. 5 shows a contiguous set of PIM routers 106a–106c, 108a–108c configured to operate within a common boundary defined by PIM Border Routers 140a, 140b. The area bounded by the border routers 140a, 140b is known as a domain 100. The PIM domain 100 borders another network domain 144 such as a DVMRP (Distance Vector Multicast Routing Protocol) domain.

The border routers 140a, 140b can interoperate with other types of multicasting networks 144. Typically, a border router 140a, 140b will run protocols of both connected networks.

As shown, a border router 140b can inject multicast data from a group source 102 in the PIM domain 100 into a different domain 144 for delivery. To program domain routers to send packets to border routers 140a, 140b, PIM defines an (*,*,RP) state.

Figure 6:
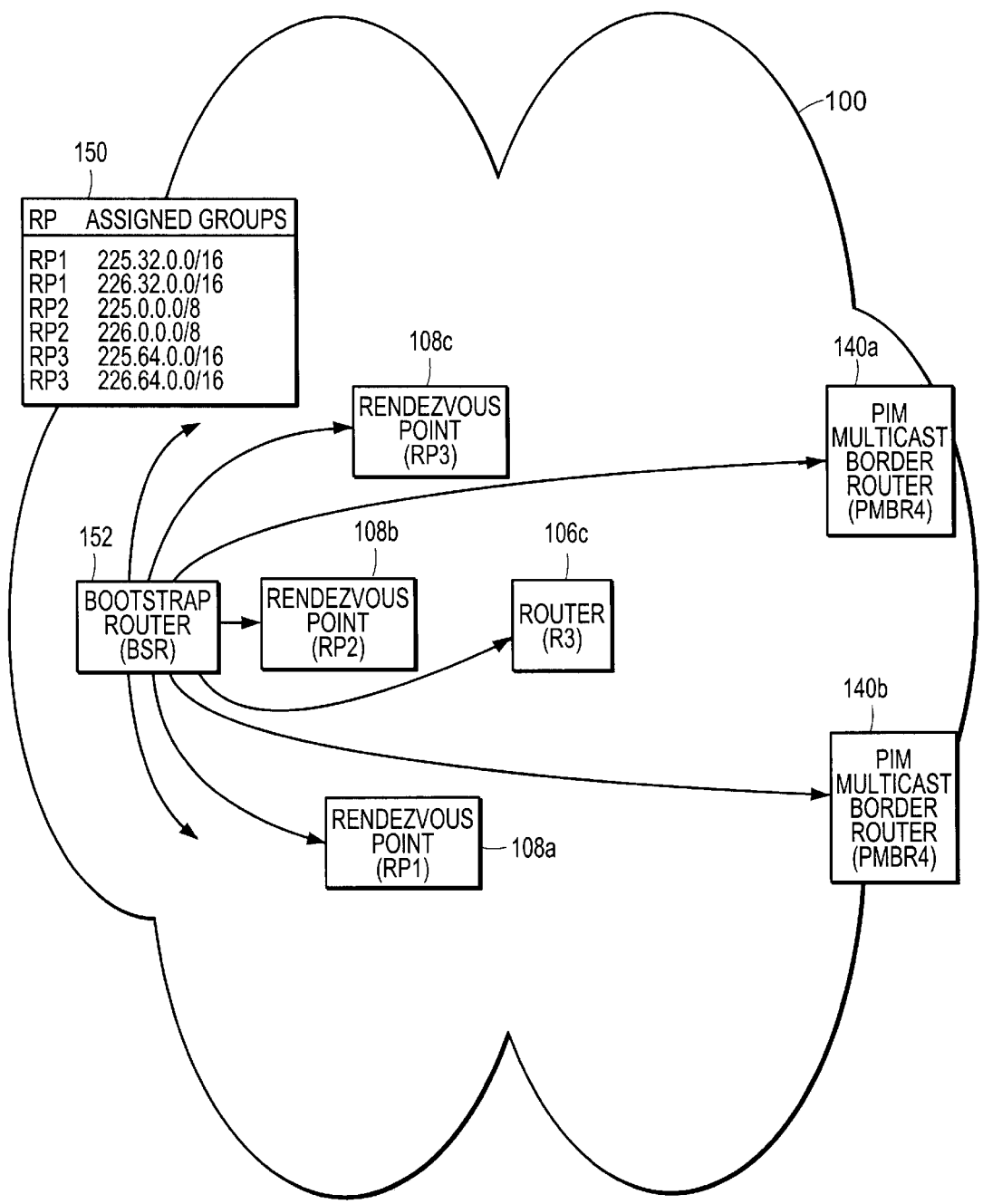
FIG. 6 is a diagram showing distribution of rendezvous point data.
Figure 7:
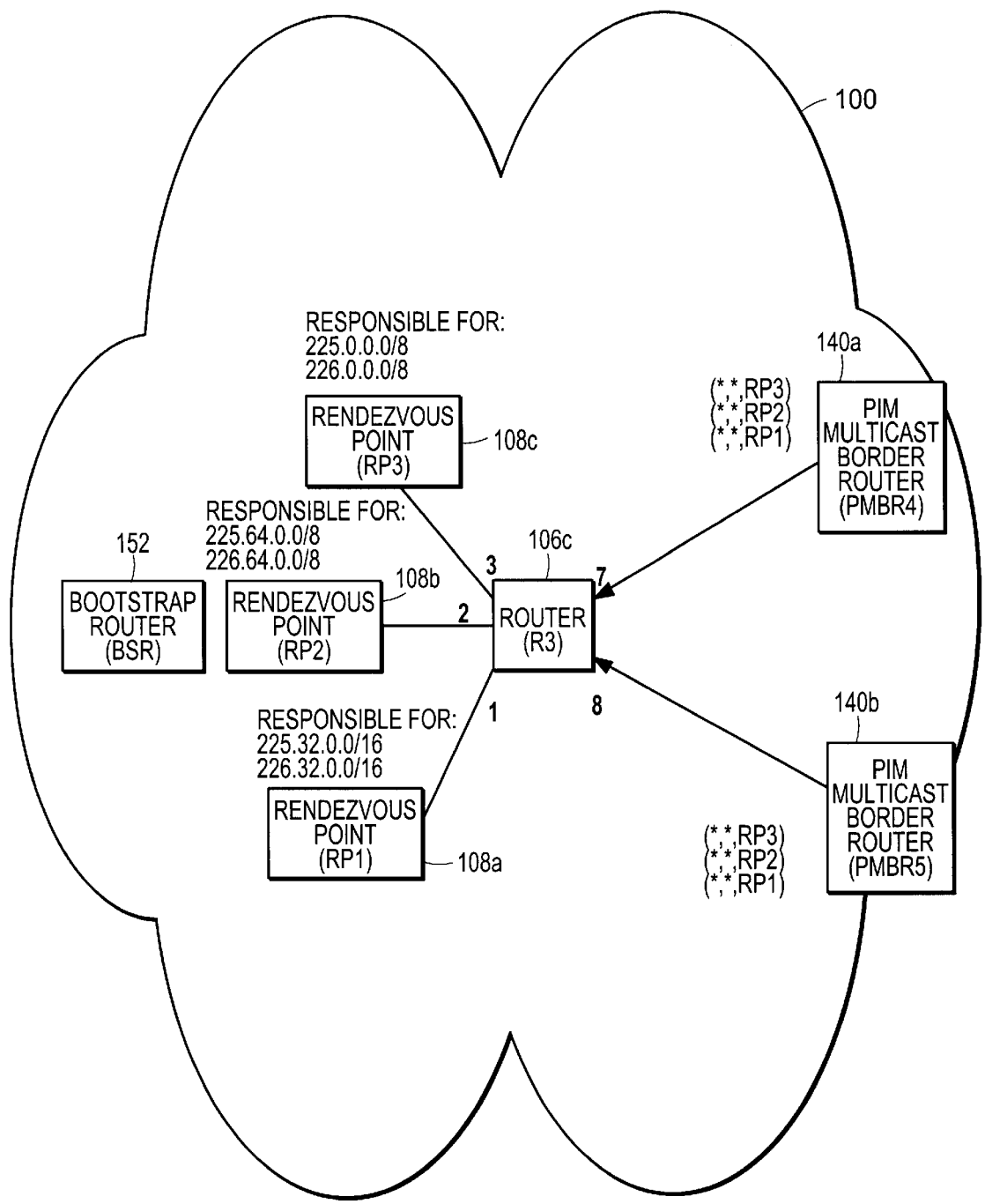
FIG. 7 is a diagram illustrating border router registration.

FIGS. 6–7 illustrate how border routers register (*,*,RP) states in PIM domain routers. As shown in FIG. 6, a bootstrap router 152 assigns different group address ranges to different rendezvous points 108a–108c. These ranges may overlap. Assigning ranges can balance the network traffic carried by each rendezvous point 108a–108c. The bootstrap router 152 floods the domain 100, including the border routers 140a, 140b, with data 150 describing the group ranges serviced by each rendezvous point 108a–108c. This data 150 is known as an "RP-set".

The group address ranges in the RP-set are described using a "prefix" notation that includes an IP address, a "/", and a number that indicates how many bits in the IP address define the range of addresses. For example, a group address range of 225.32.0.0/16 indicates that the group range covers group addresses from 225.32.0.0 to 225.32.255.255. In other words, an address is in the 225.32.0.0/16 range if its first 16-bits match the first 16-bits of the specified group address range (i.e., the first 16-bits are 225.32).

In FIG. 7, border routers 140a, 140b respond to receipt of the RP-set 150, by sending (*,*,RP) messages to each rendezvous point 108a–108c listed in the RP-set. As shown, routers 106c between the border routers 140a, 140b and the rendezvous points 108a–108c can receive multiple (*,*,RP) messages. Like (*,G) and (S,G) entries, the routers 106c can add the (*,*,RP) state to their forwarding table.

Figure 8:
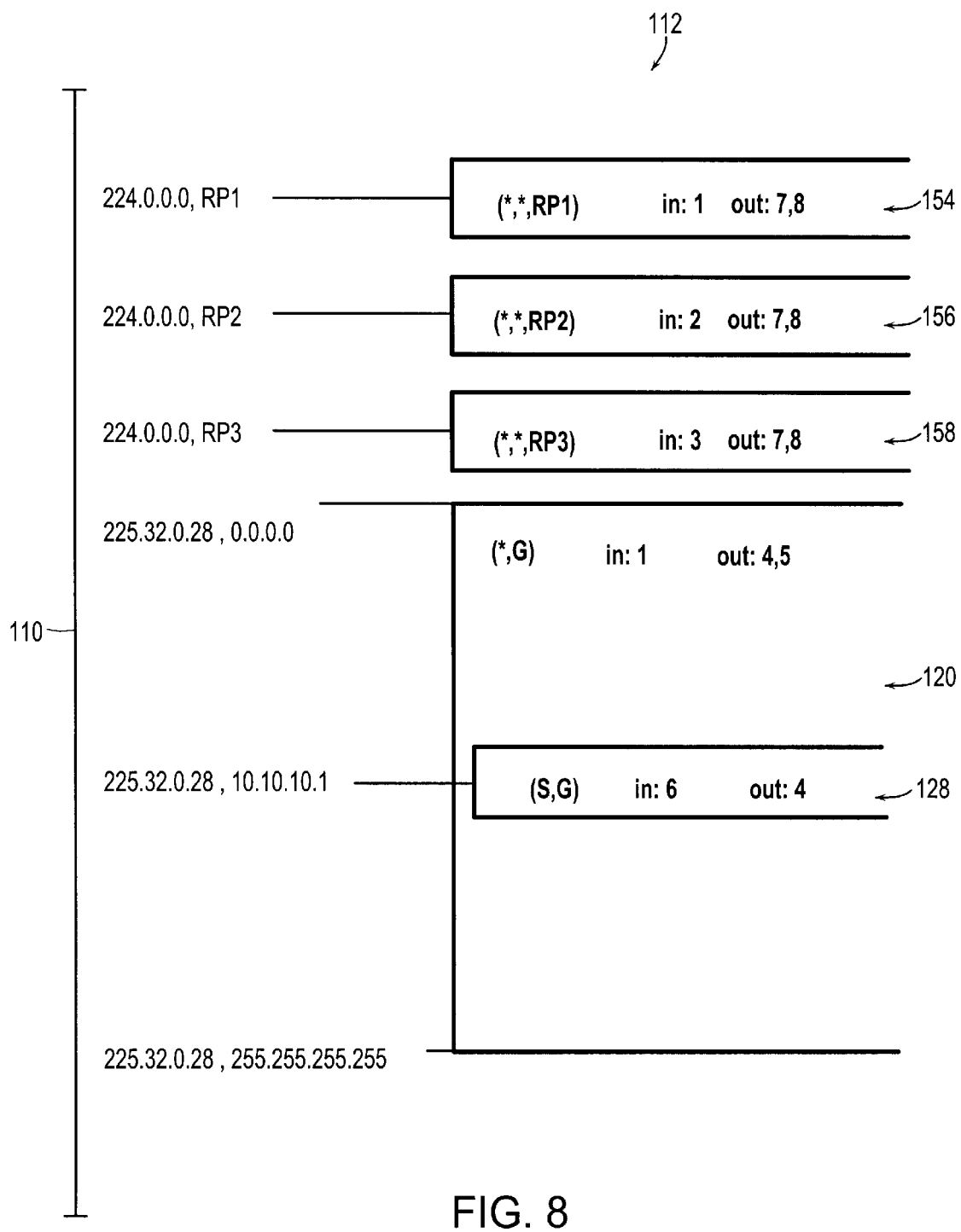
FIG. 8 is a diagram of a router forwarding table including entries for border routers.

FIG. 8 shows (*,*,RP) entry states 154, 156, 158 added to router forwarding table 112. As shown, the source address of the (*,*,RP) state in the forwarding table corresponds to the IP address of the rendezvous point receiving an (*,*,RP) message. The group address for each (*,*,RP) state is set to "224.0.0.0". This group address is reserved, thus, network packets do not ordinarily include this address. Unlike the straight-forward process needed to find a (S,G) or (*,G) state entry match, matching the (*,*,RP) state to a packet can cause a router to look-up data in the RP-set and repeatedly access the router forwarding table 112.

Figure 9:
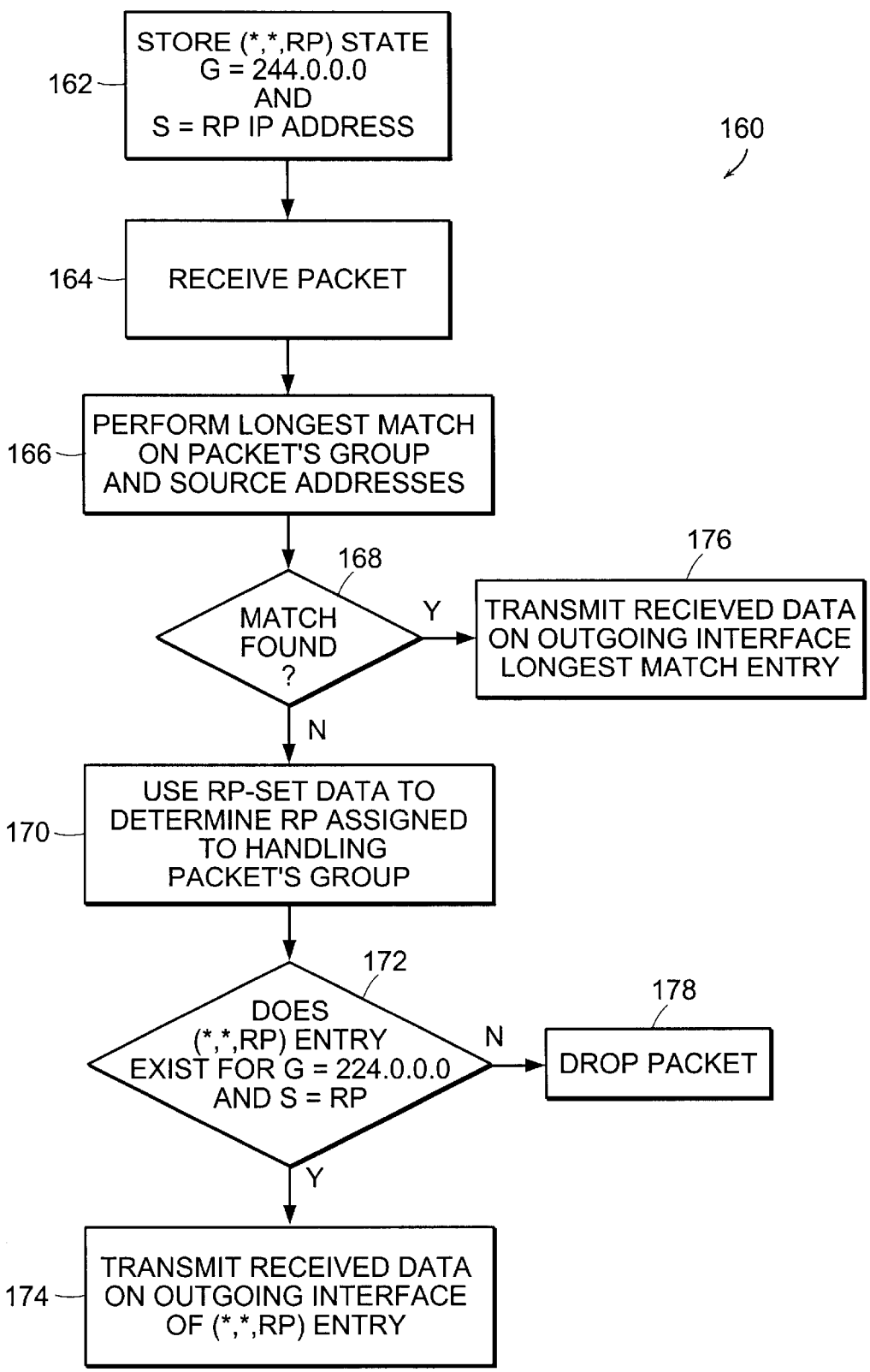
FIG. 9 is a flowchart of a process for building a router forwarding table including individual entries for border routers.

FIG. 9 shows a process 160 for routing packets to the border routers 140a, 140b when a packet's source/group address pair does not match any (S,G) or (*,G) state entries. After storing the (*,*,RP) state in the router forwarding table (as shown in FIG. 8), a router performs a longest match search 166 on a received 164 packet's source and group addresses. If a packet does not match a (S,G) or (*,G) state entry 168, the packet may correspond to an (*,*,RP) state. The router can determine (*,*,RP) matches by examining the RP-set data 170 to determine a rendezvous point services the packet's group address. The router can access 172 the router forwarding table 112 to determine if an (*,*,RP) state has been entered at a group address of 224.0.0.1 and a source address corresponding to the IP address of the rendezvous point. If the (*,*,RP) state is found 174, the router can transmit the packet over the entry's listed output interfaces. Otherwise, the router drops 178 the packet. The process 160 requires multiple look-ups in different tables. These additional lookups can consume considerable time and resources.

Assigning Forwarding Table Ranges to Border Routers

Figure 10:
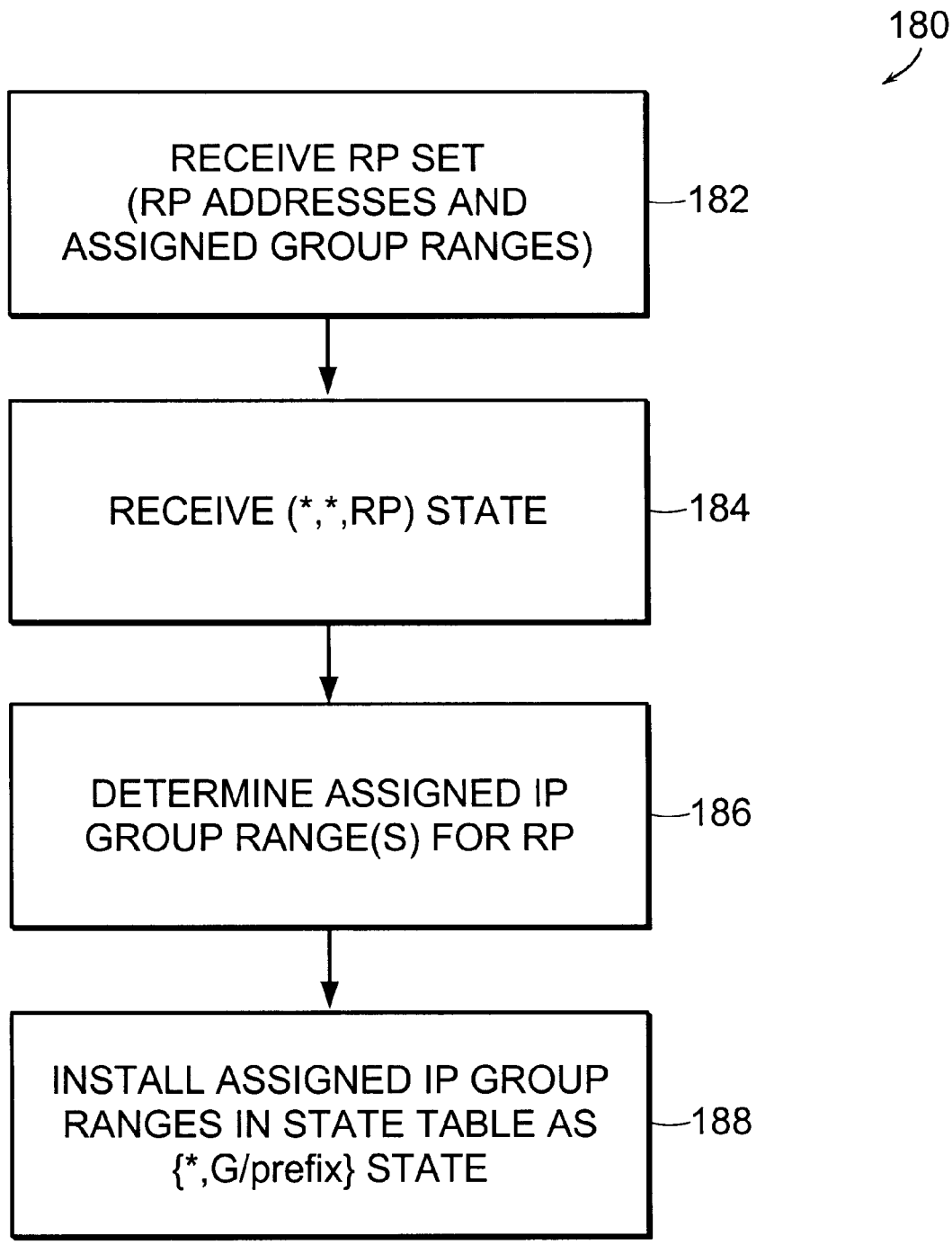
FIG. 10 is a flowchart of a process for building a router forwarding table including ranges for border routers.

FIG. 10 shows a process 180 than can reduce the number of look-ups and the amount of time needed to determine whether and how to send a packet to a border router. After receiving 182 the RP-set from the bootstrap router and receiving 184 an (*,*,RP) state from a border router, the process 186 determines the range of group address covered by the RP 186. For example, as shown in FIG. 6, RP1 is responsible for two groups 225.32.0.0/16 and 226.32.0.0/16. The router adds 188 two corresponding entry states to the forwarding table known as an (*,G/prefix) entry states. The (*,G/prefix) entry state, similar to an address range expressed in prefix notation, can cover multiple group addresses. If a longest match of a packet's source and destination group addresses falls within the (*,G/prefix) range, the router can forward the packet to one or more border routers using the interface information of the matching (*,G/prefix) state.

Figure 11:
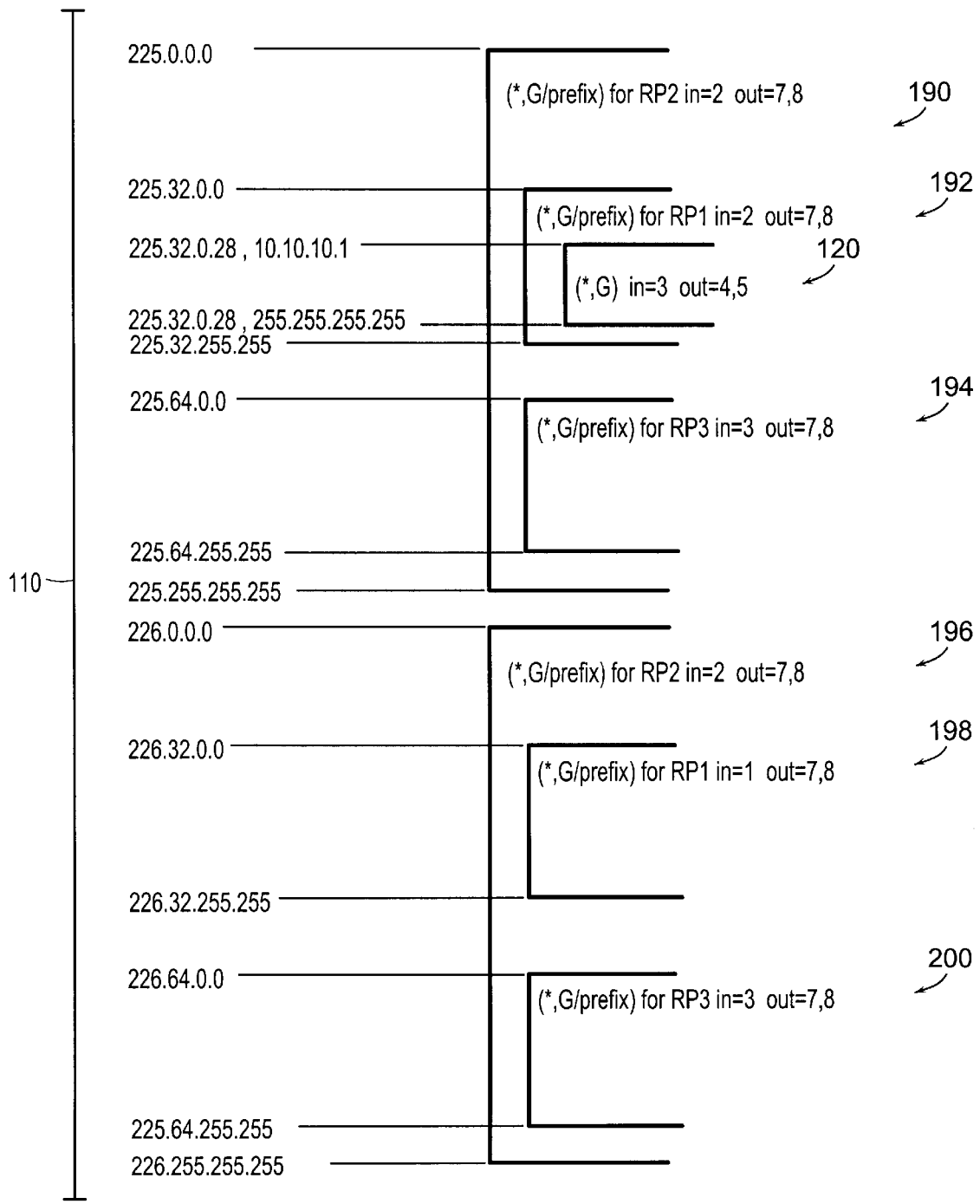
FIG. 11 is a diagram of a router forwarding table having ranges for border routers.

FIG. 11 shows a router forwarding table 112 that includes (*,G/prefix) ranges for border routers 190–200 in addition to a range corresponding to an (*,G) state 120. If a router received a packet having a group address of 225.0.0.1 and source address of 10.27.38.10, the longest match is the (*,G/prefix) state entry 190. The router can forward the packet to border routers 140a, 140b via output interfaces "6" and "7".

Figure 12:
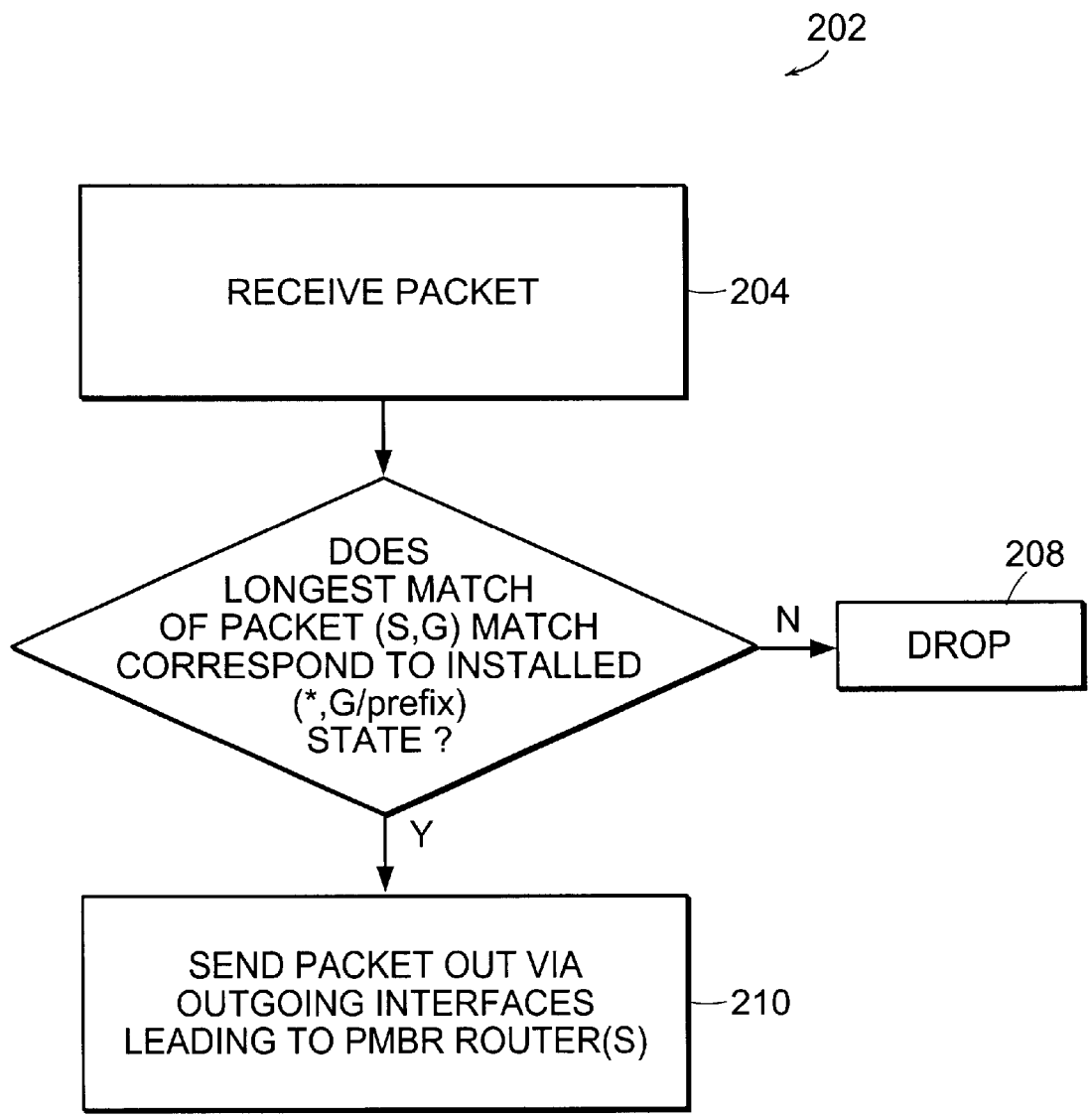
FIG. 12 is a flowchart of a process for routing packets in accordance with a router forwarding table.

FIG. 12 shows a process 202 for using a router forwarding table to forward packets. The process 202 receives a packet 204 and determines the packet's source and group IP addresses. The process 202 then performs a longest match search 206. If the longest match corresponds to a (S,G), (*,G), or (*,G/prefix) state, the packet may be forwarded via the output interfaces specified by the matching state 210. Otherwise the router drops 208 the packet. By defining an (*,G/prefix) state for an (*,*,RP) state, routing to border routers does not require special handling or time consuming lookups in different tables.

Other embodiments are within the scope of the following claims.

What is claimed is:

1. A method of routing network packets to a border router joining different network domains, the method comprising:

defining a range of addresses for the border router in a router forwarding table including determining group addresses serviced by a rendezvous point;

receiving a network packet;

determining at least one address included in the network packet;

performing a search on the router forwarding table using the at least one determined addresses; and transmitting the packet to the border router if the defined range of addresses matches for the at least one determined address.

2. The method of claim 1 wherein performing a search comprises performing a longest match search.

3. The method of claim 1 wherein one of the network domains comprises a Protocol Independent Multicasting (PIM) sparse-mode domain.

4. The method of claim 1 wherein determining group addresses comprises looking up the group addresses in an RP-set that describes group addresses serviced by rendezvous points.

5. The method of claim 1 wherein defining a range of addresses comprises adding an (*,G/prefix) state to the router forwarding table for the range of addresses.

6. The method of claim 1 wherein determining at least one address comprises determining the source address of the network packet.

7. The method of claim 1 wherein determining at least one address comprises determining the destination address of the network packet.

8. The method of claim 1 wherein determining at least one address comprises determining an Internet Protocol (IP) address.

9. The method of claim 1 wherein performing the search comprises determining whether the match is an (S,G) state.

10. The method of claim 1 wherein performing the search comprises determining whether the match is an (*,G) state.

11. The method of claim 1 wherein performing the match comprises determining whether the match is an (*,G/prefix) state.

12. The method of claim 1 wherein the router forwarding table comprises group and source address pairs and corresponding Protocol Independent Multicasting (PIM) states.

13. The method of claim 1 wherein the router forwarding table comprises group and source address pairs and corresponding input and output interfaces.

14. The method of claim 13 wherein transmitting the packet to the border router comprises transmitting the packet via an output interface corresponding to the state determined by the longest match search.

15. A method of routing network packets to a Protocol Independent Multicasting (PIM) border router that joins a PIM sparse-mode domain with a different network domain, the method comprising:

receiving a PIM (*,*,RP) state transmitted by the PIM border router to a rendezvous point RP;

determining group addresses handled by the rendezvous point; and defining a (*,G/prefix) state in a router forwarding table based on the determined group addresses of the PIM rendezvous point RP.

16. The method of claim 15 further comprising:

receiving a network packet;

performing a longest match search using the network packet's group address; and if the longest match search corresponds to the defined (*,G/prefix) state, transmitting the network packet to the border router.

17. A computer program, disposed on a computer readable medium, for routing network packets to a border router joining different network domains, the program including instructions for causing a router to:

define a range of addresses for the border router in a router forwarding table including determining group addresses serviced by a rendezvous point;

receive a network packet;

determine addresses included in the network packet;

perform a search on the router forwarding table using the determined addresses; and transmit the packet to the border router if the defined range of addresses matches for the determined addresses.

18. The computer program of claim 17 wherein the search comprises a longest match search.

19. The computer program of claim 17 wherein the instructions that define a range of addresses comprise instructions that add an (*,G/prefix) state to the router forwarding table for the range of addresses.

* * * * *